United States Patent [19]

Suzuki et al.

[11] Patent Number: 4,892,282

[45] Date of Patent: Jan. 9, 1990

[54] SEAT SLIDING APPARATUS FOR VEHICLES

[75] Inventors: Saburo Suzuki, Tokoname; Takami Terada, Toyota; Masayuki Yamazaki, Himi, all of Japan

[73] Assignee: Aisin Seiki,Co. Ltd., Japan

[21] Appl. No.: 250,465

[22] Filed: Sep. 28, 1988

[30] Foreign Application Priority Data

Sep. 29, 1987 [JP] Japan .......................... 62-148999[U]

[51] Int. Cl.[4] ............................................ F16M 13/00
[52] U.S. Cl. .................................... 248/430; 240/429; 384/34
[58] Field of Search ...................... 248/429, 430, 420; 384/47, 34, 22

[56] References Cited

U.S. PATENT DOCUMENTS

| | | | |
|---|---|---|---|
| 3,479,099 | 11/1969 | Krause | 248/429 X |
| 3,944,302 | 10/1974 | Fourrey | 384/47 |
| 4,018,488 | 4/1977 | Manson | 248/429 X |
| 4,089,500 | 5/1978 | Gustafsson | 248/429 |
| 4,210,303 | 7/1980 | Torta et al. | 248/429 |
| 4,685,716 | 8/1987 | Kondo | 248/429 X |
| 4,742,983 | 5/1988 | Nihei | 248/429 |
| 4,776,551 | 10/1988 | Nishino | 248/429 |

*Primary Examiner*—Ramon S. Britts
*Assistant Examiner*—David M. Purol
*Attorney, Agent, or Firm*—Finnegan, Henderson, Farabow, Garrett & Dunner

[57] ABSTRACT

A seat sliding apparatus for vehicles includes a upper rail fixedly connected to a lower portion of a seat, a lower rail connected to the upper rail, and a reinforcing member provided along an inside portion of a sectional surface on the end portion of the lower rail.

4 Claims, 1 Drawing Sheet

PRIOR ART

SEAT SLIDING APPARATUS FOR VEHICLES

BACKGROUND OF THE INVENTION

1. Field of the Invention

This invention relates to a seat sliding apparatus for vehicles, and more particularly to a seat sliding apparatus for vehicles in which a seat rail is reinforced.

2. Description of the Prior Art

A conventional seat sliding apparatus for vehicles is shown in FIG. 3, namely, an upper rail 6 and a lower rail 7 are connected to each other through a roller 8 and a steel ball 9, so that the smooth sliding can be attained between upper and lower rails 6, 7. This type of the art is disclosed in Japanese Utility Model Open Letter No. 61(1986)-138729. However, a separating load is applied on both rails 6, 7 upon using this type of the slidable seat. When the separating load is applied to the lower rail 7, a lateral wall 7a of the lower rail 7 is inwardly inclined and deformed as clearly viewed from FIG. 4. Therefore, it creates a dangerous state in which the upper rail 6 is separated from the lower rail 7. The dangerous state by the separation of the upper rail 6 from the lower rail 7 depends on a frequency of use and using manner of a seat, number of years in use, and weight of a user.

SUMMARY OF THE PRESENT INVENTION

It is primary object of the present invention, which is inspired under the aforementioned circumstances and obviates the above-described problems, to provide a seat sliding apparatus for vehicles.

In accordance with the present invention, a reinforcing member is fixedly connected to along an inside of both end portions of the lower rail, thereby preventing the inward inclination of the lateral wall of the lower rail.

BRIEF DESCRIPTION OF THE DRAWINGS

Other and further objects, features and advantages of the present invention will be understood more fully from the detailed description of preferred embodiment with reference with the attached drawings.

DETAILED DESCRIPTION OF PREFERRED EMBODIMENTS

Figure 1:
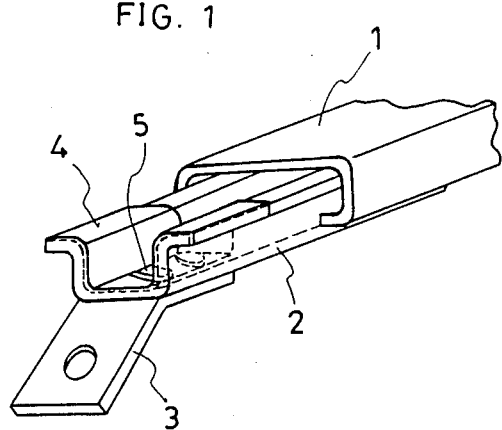
FIG. 1 is a perspective view of a seat sliding apparatus according to the present invention.
Figure 2:
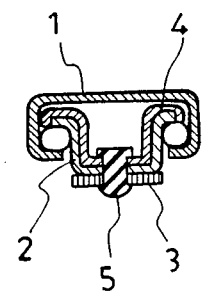
FIG. 2 is a sectional view showing an essential portion of the present invention.
Figure 3:
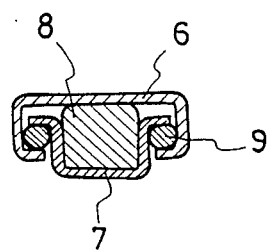
FIG. 3 is a view similar to FIG. 2, however, showing a conventional seat sliding apparatus.
Figure 4:
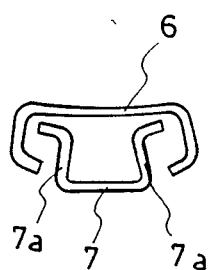
FIG. 4 is an explanatory view, however, showing a state in which a separating load is acted on a lower rail in FIG. 3.

Referring now to FIGS. 1, 2, reference numeral 1 indicates a upper rail which is fixed to a lower portion of a seat for vehicles and is forwardly and rearwardly moved. Reference numeral 2 denotes a lower rail which is fixed to a floor by means of a bracket 3. As shown from these FIGS. 1, 2, a reinforcing member 4 is located along an inside section of the lower rail 2 on both end portions of the lower rail 2, respectively (only one side is shown in FIGS.). Reinforcing member 4, lower rail 2, and bracket 3 are integrally connected by caulking.

As abovementioned, the separating load is applied to the upper rail 1 and the upper rail 1 is about to be separated from the lower rail 2 by the deformation of the lower rail 2. However, the end portions of the lower rail 2 has a high rigidity due to the reinforcing member 4, so that the lower rail 2 is not easily deformed by the separating load. Accordingly, the seat sliding apparatus for vehicles according to the present invention has a high resistance to a separating load compared with the conventional seat sliding apparatus for vehicles.

As this result, the seat sliding apparatus for vehicles according to the present invention can endure the large separating load compared with the conventional seat sliding apparatus for vehicles. Therefore, the thickness of the lower rail can be minimized and the seat rail can be lighter in weight.

Further, when the end surface of the lower rail is covered by the reinforcing member, the finishing of the edge of the end surface thereof is not necessary and the outer appearance thereof is also improved.

Additionally, the rivet prevents the removal of the reinforcing member compared with the conventional rivet connection of the lower rail and the bracket.

The invention has thus been shown and described with reference to specific embodiments, however, it should be noted that the invention is in no way limited to the details of the illustrated structures but changes and modifications may be made without departing from the scope of the appended claims.

What is claimed:

1. A slide assembly for a seat, comprising:
    a longitudinally extending elongated lower rail having a generally U-shaped cross sectional configuration with a central base portion and spaced legs each with an outwardly extending flange portion adjacent an outer end, each flange portion having an edge surface;
    a bracket affixed to the lower rail for fastening the rail to a surface with the legs extending in a substantially upward direction;
    an upper rail, for attachment to the seat, slidably mounted to the lower rail for longitudinal movement relative the lower rail;
    a reinforcing member having a length substantially shorter than the lower rail and having a generally U-shaped cross-sectional configuration with outwardly extending flange portions substantially corresponding to the lower rail cross-section, said member being disposed in mating relationship adjacent at least one end of the lower rail extending longitudinally for a portion of the length thereof providing lateral rigidity to the lower rail; and
    means for fixing said reinforcing member to said lower rail.

2. The assembly of claim 1, wherein the outwardly extending flange portions of said reinforcing member cover the edge surfaces of said lower rail.

3. The assembly of claim 1, wherein the means for fixing said reinforcing member to said lower rail include a rivet.

4. The assembly of claim 1, wherein the means for fixing said reinforcing member to said lower rail include an adhesive.

* * * * *

UNITED STATES PATENT AND TRADEMARK OFFICE
CERTIFICATE OF CORRECTION

PATENT NO. : 4,892,282
DATED : January 9, 1990
INVENTOR(S) : Saburo SUZUKI et al.

It is certified that error appears in the above-identified patent and that said Letters Patent is hereby corrected as shown below:

On the title page, item [73]:
The Assignee is changed from "Aisin Seiki, Co. Ltd., Japan"
to --Aisin Seiki Kabushiki Kaisha, and Aisin Keikinzoku Kabushiki Kaisha, both of Japan--.

Signed and Sealed this

Sixteenth Day of April, 1991

Attest:

HARRY F. MANBECK, JR.

Attesting Officer

Commissioner of Patents and Trademarks